United States Patent
Mannava et al.

(10) Patent No.: US 10,282,297 B2
(45) Date of Patent: May 7, 2019

(54) READ-WITH OVERRIDABLE-INVALIDATE TRANSACTION

(71) Applicant: ARM Limited, Cambridge (GB)

(72) Inventors: Phanindra Kumar Mannava, Austin, TX (US); Bruce James Mathewson, Papworth Everard (GB); Jamshed Jalal, Austin, TX (US); Mark David Werkheiser, Austin, TX (US)

(73) Assignee: ARM Limited, Cambridge (GB)

( * ) Notice: Subject to any disclaimer, the term of this patent is extended or adjusted under 35 U.S.C. 154(b) by 82 days.

(21) Appl. No.: 15/427,320

(22) Filed: Feb. 8, 2017

(65) Prior Publication Data

US 2018/0225209 A1      Aug. 9, 2018

(51) Int. Cl.
*G06F 12/08* (2016.01)
*G06F 12/0831* (2016.01)
(Continued)

(52) U.S. Cl.
CPC ...... *G06F 12/0831* (2013.01); *G06F 12/0804* (2013.01); *G06F 12/084* (2013.01); *G06F 12/0808* (2013.01); *G06F 12/0811* (2013.01); *G06F 12/0842* (2013.01); *G06F 12/0891* (2013.01); *G06F 12/0897* (2013.01); *G06F 2212/1016* (2013.01); *G06F 2212/302* (2013.01); *G06F 2212/6042* (2013.01)

(58) Field of Classification Search
CPC ......... G06F 2212/2542; G06F 12/0804; G06F 12/0808; G06F 12/0806; G06F 12/0815; G06F 12/0833; G06F 12/0891; G06F 3/0619; G06F 12/088; G06F 12/0831; G06F 12/0811; G06F 12/084; G06F 12/0842; G06F 12/0897; G06F 2212/1016; G06F 2212/302; G06F 2212/6042

USPC .................................................. 711/121, 118
See application file for complete search history.

(56) References Cited

U.S. PATENT DOCUMENTS

2003/0009641 A1    1/2003   Arimilli et al.
2003/0195939 A1*  10/2003   Edirisooriya ....... G06F 12/0833
                                                              709/212
(Continued)

OTHER PUBLICATIONS

UK Combined Search and Examination Report dated Jun. 7, 2018 in GB Application No. 1721433.9, 8 pages.
(Continued)

*Primary Examiner* — Hiep T Nguyen
(74) *Attorney, Agent, or Firm* — Nixon & Vanderhye P.C.

(57) ABSTRACT

A system comprises a number of master devices and an interconnect for managing coherency between the master devices. In response to a read-with-overridable-invalidate transaction received by the interconnect from a requesting master device requesting that target data associated with a target address is provided to the requesting master device, when target data associated with the target address is stored by a cache, the interconnect issues a snoop request to said cache triggering invalidation of the target data from the cache except when the interconnect or cache determines to override the invalidation and retain the target data in the cache. This enables greater efficiency in cache usage since data which the requesting master considers is unlikely to be needed again can be invalidated from caches located outside the master device itself.

18 Claims, 3 Drawing Sheets

(51) Int. Cl.
*G06F 12/0804* (2016.01)
*G06F 12/0808* (2016.01)
*G06F 12/0811* (2016.01)
*G06F 12/084* (2016.01)
*G06F 12/0842* (2016.01)
*G06F 12/0891* (2016.01)
*G06F 12/0897* (2016.01)

(56) References Cited

U.S. PATENT DOCUMENTS

| | | | |
|---|---|---|---|
| 2007/0022254 A1* | 1/2007 | Veazey | G06F 12/0817 711/142 |
| 2009/0037661 A1* | 2/2009 | Fairhurst | G06F 12/0891 711/133 |
| 2010/0332767 A1* | 12/2010 | Kumar | G06F 12/0817 711/146 |
| 2011/0173367 A1 | 7/2011 | Ajanovic et al. | |
| 2014/0143487 A1 | 5/2014 | Habusha et al. | |
| 2017/0060763 A1* | 3/2017 | Maheshwari | G06F 12/0866 |
| 2018/0034931 A1* | 2/2018 | Chakra | H04L 67/2842 |

OTHER PUBLICATIONS

ARM Limited, A. Stevens, ARM White Paper, "Introduction to AMBA ® 4 ACE and big.LITTLE Processing Technology" Jun. 6, 2011, updated Jul. 29, 2013, 15 pages.

\* cited by examiner

READ-WITH OVERRIDABLE-INVALIDATE TRANSACTION

BACKGROUND

Technical Field

The present technique relates to the field of data processing.

Technical Background

A data processing system may include a number of master devices which may share access to a memory system. Some of the master devices may have a cache for holding data from the memory system. A coherent interconnect may be provided to maintain coherency between the data held in the caches and/or read/write transactions initiated by master devices corresponding to uncached data, based on coherency protocol transactions defined according to a particular coherency protocol.

SUMMARY

At least some examples provide a system comprising:
a plurality of master devices; and
an interconnect to manage coherency between the plurality of master devices;
wherein in response to a read-with-overridable-invalidate transaction received by the interconnect from a requesting master device requesting that target data associated with a target address is provided to the requesting master device, when target data associated with the target address is stored by a cache, the interconnect is configured to issue a snoop request to said cache, said snoop request triggering invalidation of the target data from the cache except when at least one of said interconnect and said cache determines to override the invalidation and retain the target data in the cache.

At least some examples provide a master device comprising:
processing circuitry to execute data access operations; and
interface circuitry responsive to the data access operations to issue transactions to an interconnect for managing coherency between the master device and at least one other master device;
wherein the interface circuitry is configured to issue a read-with-overridable-invalidate transaction to the interconnect requesting that target data associated with a target address is provided to the master device, and, when the target data is stored in a cache, triggering invalidation of the target data from the cache except when at least one of said interconnect and said cache determines to override the invalidation and retain the target data in the cache.

At least some examples provide an interconnect comprising:
interface circuitry to communicate with a plurality of master devices; and
control circuitry to manage coherency between the master devices in dependence on transactions exchanged with the master devices via the interface circuitry;
wherein in response to a read-with-overridable-invalidate transaction received by the interface circuitry from a requesting master device requesting that target data associated with a target address is provided to the requesting master device, when target data associated with the target address is stored by a cache, the control circuitry is configured to control the interface circuitry to issue a snoop request, said snoop request triggering invalidation of the target data from the cache except when at least one of said control circuitry and said cache determines to override the invalidation and retain the target data in the cache.

At least some examples provide an apparatus comprising:
a cache to store data;
interface circuitry to receive, from an interconnect for managing coherency of data in the cache, a snoop-with-overridable-invalidate request specifying a target address of target data and requesting that the target data is invalidated from the cache; and
control circuitry to determine whether to override the invalidation of the target data and retain the target data in the cache in response to the snoop-with-overridable-invalidate request.

At least some examples provide a method comprising:
receiving, at an interconnect for managing coherency between a plurality of master devices, a read-with-overridable-invalidate transaction issued by a requesting master device requesting that target data associated with a target address is provided to the requesting master device; and
in response to the read-with-overridable-invalidate transaction:
obtaining the target data from a cache or memory;
providing the target data to the requesting master device; and
when the target data is stored by the cache, triggering invalidation of the target data from the cache except when at least one of said interconnect and said cache determines to override the invalidation and retain the target data in the cache.

Further aspects, features and advantages of the present technique will be apparent from the following description of examples, which is to be read in conjunction with the accompanying drawings.

DESCRIPTION OF EXAMPLES

Figure 1:
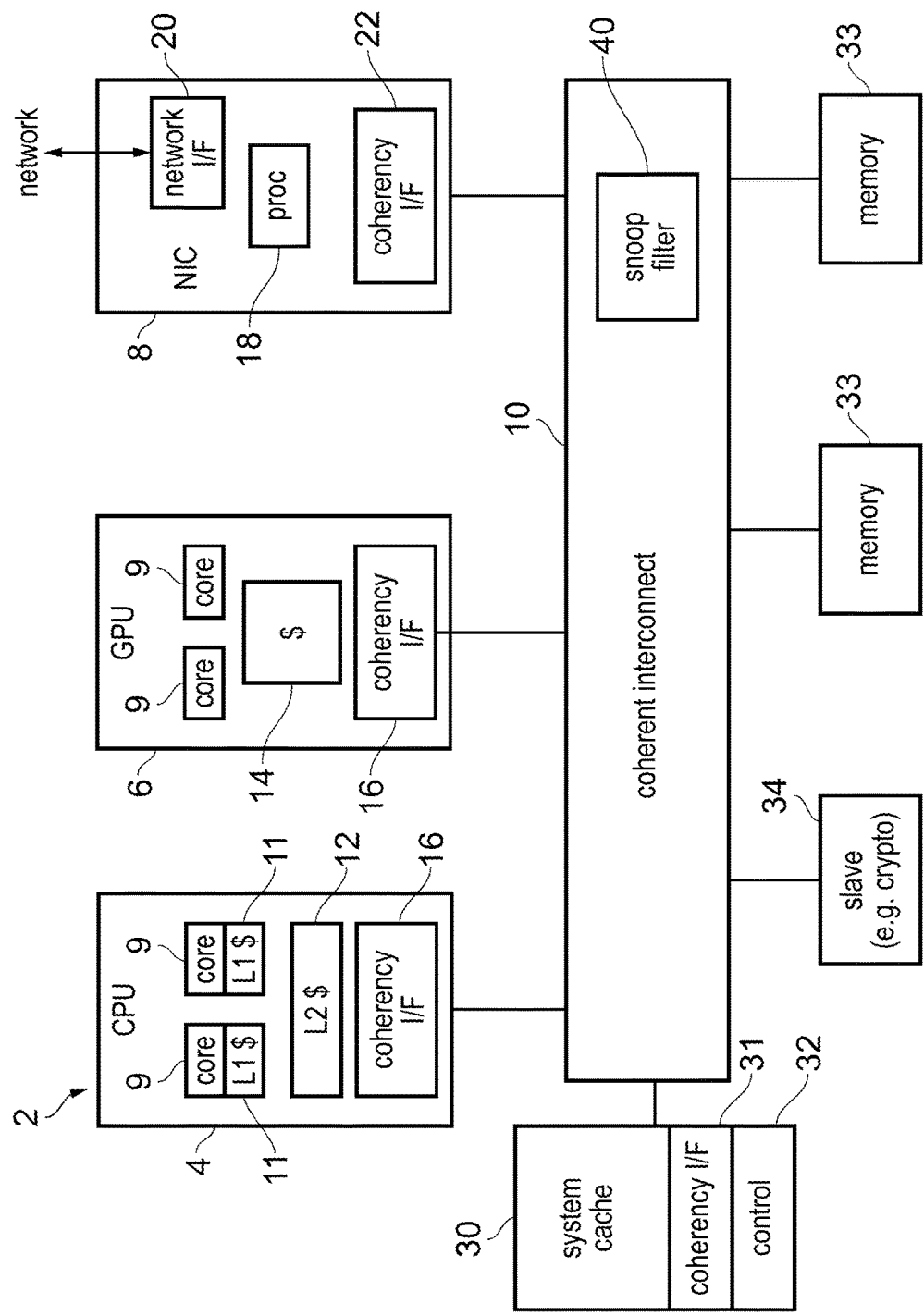
FIG. 1 illustrates an example of a system having a number of master devices and an interconnect for managing coherency between the master devices.

A data processing system may comprise a number of master devices and an interconnect to manage coherency between the master devices, which may include cached masters having a cache and/or uncached masters not having a cache. A number of types of transactions may defined according to a given coherency protocol to control the way in which a read or write access to data by one master may trigger changes in coherency status of cached data held elsewhere in the system.

The present technique provides a read-with-overridable-invalidate transaction which may be issued by a requesting master device specifying a target address identifying target data to be provided to the requesting master device. In response, the interconnect obtains the target data (e.g. from a cache or memory) and returns the data to the requesting master device. When the data is held by a cache (which could be a cache of another master device or a system-level cache not assigned to a particular master device), the interconnect issues a snoop request to the cache to trigger invalidation of the target data from the cache except when at least one of the interconnect and the cache determines to override the invalidation and retain the target data in the cache.

Hence, the read-with-overridable-invalidate transaction allows the requesting master device to signal that an invalidation of data to be read is expected but not essential, with the interconnect and/or the cache holding the target data having the discretion to determine whether or not to override the invalidation. The read-with-overridable-invalidate transaction can be viewed as a hint from the requesting master device that it expects it will not be useful for the data to continue to be held in the cache, but if the interconnect or the cache knows better (e.g. based on previous traffic of address accesses), they can choose to ignore the hint from the requesting master device and retain the data.

This type of transaction may be particularly useful in networking applications for example. A network interface may be transmitting packets read from a cache over a network, and once the network interface has transmitted the packet, that packet will not typically be accessed again and so there may be no ongoing benefit from keeping a copy of the data in the cache. The master device which reads that data will typically be aware of the nature of the data and so can use the read-with-overridable-invalidate transaction in situations where repeated use of the data is unlikely, to signal to other caches that this data can be invalidated. While the invalidation does not need to be performed in order to maintain coherency or functional correctness, by removing a cache line that is unlikely to be used again in future, this frees an unallocated cache entry which can be selected on a later cache allocation, avoiding an unnecessary eviction of a different cache line that would have benefited from remaining in the cache. Hence, by using the read-with-overridable-invalidate transaction instead of a read which does not provide an invalidate hint, greater efficiency in cache usage can be achieved and hence the performance of the system as a whole improved by reducing the chance that required data is not in the cache.

Note that the snoop request triggered by the read-with-overridable-invalidate transaction could in some cases only be sent to caches known to be holding the target data associated with the target address. For example the interconnect could have a snoop filter or directory which tracks which caches hold a given address, which can be used to avoid sending snoop requests to caches which do not hold the target data. However, in some systems there may not be any snoop filter or the tracking of the snoop filter could be less precise, so that snoop requests may also be sent to some caches not holding the target data, and in this case the snoop request to a cache not holding the data may trigger a snoop response which indicates that the data is not held in the cache. Hence, the invalidation of the target data may only happen if there is target data in the cache receiving the snoop request.

In some cases, the snoop request used to trigger the invalidation from the cache may also cause the cache to return the data to the interconnect so that it can be passed to the requesting master. However, whether or not the data is actually returned to the master may depend on the coherency status of the data—e.g. if several caches hold shared target data, the target data may be returned by a cache holding the target data in a shared dirty state, but caches holding the target data in a shared clean state may not need to return the data as it may be assumed that another cache is holding the data in a shared dirty state. Alternatively, if a cache is the only cache holding the data then it may need to return the data regardless of whether the data is clean or dirty. The precise conditions under which the data is actually returned by the cache may depend on the particular coherency protocol being used. Regardless of whether the data is returned or not, the snoop request to the cache triggers an overridable invalidation of the cached data having the specified target address.

Different forms of the read-with-overridable-invalidate transaction may be provided. In response to a first form of the read-with-overridable-invalidate transaction, when the target data is invalidated from the cache and the target data is dirty, the interconnect may trigger a write back of the target data to a memory or a further cache. This form of the transaction can be used in cases when although it is unlikely that the data will be needed again, it is possible it could still be needed, and so to ensure that the data is retained if required later the dirty data is written back to the memory or further cache.

However, a second form of the read-with-overridable-invalidate transaction may be provided for which, when the target data is invalidated from the cache and the target data is dirty, writeback of the target data to the memory or further cache may be suppressed. Hence, in scenarios where the requesting master device knows that it is guaranteed that the data will never be needed again, it is possible to invalidate the cache entry and avoid cleaning the data to main memory or a further cache. This form of the transaction helps to reduce the amount of write traffic to the main memory. This transaction can be particularly useful in networking applications where, for example, networking packets may be streamed into a system-on-chip and written to a system-level cache where they are held in dirty cache lines, and as they are transmitted from the system-on-chip the packets may be read and invalidated from the cache. In this situation once transmitted it is generally known that the packets will not be needed again. By using the second form of the read-with-overridable-invalidate transaction, an unnecessary stream of write traffic from the interconnect to main memory or a further cache can be avoided, saving an amount of write bandwidth equivalent to the network packet throughput, and hence increasing performance for other write traffic. The requesting master device may need to be cautious in its use of the second form of the read-with-overridable-invalidate transaction as following this transaction the data may be lost, but in situations where it is known that the data will never be needed again, then this can be very useful.

Also, a third form of the read-with-overridable-invalidate transaction may trigger the interconnect to determine whether or not an invalidation of dirty data from the cache is written back. Hence, unlike the first form for which writeback is compulsory, and the second form for which no writeback is performed, the third form allows for writeback to be optional, with the interconnect having the discretion to decide whether or not the writeback is performed. For example, this form of the read-with-overridable-invalidate transaction can be used by the requesting master in cases where the requesting master believes the target data is guaranteed not to be needed again and so no writeback is required (e.g. in the packet streaming case discussed above), but the interconnect has the ability to overrule and instead trigger a writeback. For example, the determination of whether the writeback is performed may be based on recent address access behaviour.

Some implementations may implement all three of the forms of read-with-overridable-invalidate transaction discussed above. Others may only implement one or two of these forms of read-with-overridable-invalidate transaction (e.g. only the first and second forms but not the third).

The read-with-overridable-invalidate transaction can be a cached read transaction for which, when the target data is returned to the requesting master device, the target data is cached in a cache of the requesting master device. However, the technique is particularly useful where the read-with-overridable-invalidate transaction comprises an uncached read transaction requesting that the target data is returned to the requesting master device with caching of the target data at the requesting master device being suppressed. For example, the requesting master device may not have a cache at all, so may use the uncached read transaction to signal to the interconnect that the data will not be retained locally. Alternatively, even if the requesting master device does have a cache, it may choose to issue uncached read transactions when accessing short-lived data to avoid polluting the cache and leave more space available for more frequently accessed data for which caching is more useful. In practice, the scenarios in which it is likely to be useful for the master device to trigger an invalidation of the read target data from another device's cache are also the situations in which uncached read transactions are useful. For example, when data will not be used again, it is not necessary to cache the data at the requesting master and it is also not useful to continue storing the data at other caches. Therefore, some implementations could provide an uncached read-with-overridable-invalidation transaction, but not a cached read-with-overridable-invalidate transaction. Nevertheless, other implementations could also provide a cached read-with-overridable invalidate transaction.

When determining whether to override the invalidation in response to the read-with-overridable-invalidate transactions, the interconnect and/or the cache holding the target data could make the determination depending on monitoring of addresses accessed in the cache. For example, by monitoring address traffic, if the interconnect or cache detects that the software is accessing data in a similar address region to the target data then the interconnect or cache could determine not to invalidate the target data in case the target data is still required.

The read-with-overridable-invalidate transaction may also be compatible with interconnects or caches which either choose to always override the invalidation or to always perform the invalidation of the target data. For example, legacy devices or interconnects which were not designed for use with the read-with-overridable-invalidate transaction may not have any logic for determining whether or not to override the invalidation and so could always invalidate or always override as appropriate. Nevertheless, at least some caches or interconnects in the system may determine whether or not to override dynamically based on factors such as recent address traffic or the current utilisation of the cache.

In some examples the determination of whether to override the invalidation in response to the read-with-overridable-invalidate transaction may be made by the interconnect. The interconnect may then select whether the snoop request issued to the cache in response to the read-with-overridable-invalidate transaction is an invalidating snoop request which requests invalidation of the target data from the cache, or a non-invalidating snoop request which requests a snoop operation for which the target data is retained in the cache (the requested snoop operation could be a request for the data to be read and returned, or could merely request information on the coherency state (e.g. clean/dirty) in which the target data is held in the cache, for example). Hence, the interconnect can vary the type of snoop request sent to the cache depending upon whether it chose to follow the invalidation hint provided by the requesting master or override the invalidation. This approach can be useful so that legacy caches can be used without modification. The cache itself may simply receive an invalidating snoop request or a non-invalidating snoop request which is processed in the same way as if the snoop was triggered by a different kind of read request other than the read-with-overridable invalidate transaction. The logic for determining whether or not to override the invalidate transaction can instead be located within the interconnect.

Alternatively, the decision on whether to override the invalidation may take place at the cache itself. This could sometimes be useful as the cache may have greater knowledge of recent access patterns or access patterns expected in future. In response to the read-with-overridable-invalidate transaction, the interconnect may issue a snoop-with-overridable-invalidate request as the snoop request sent to the cache, and in response to the snoop-with-overridable-invalidate request, the cache may determine whether to override the invalidation. Hence, a special kind of snoop may be defined which is different to the standard invalidating or non-invalidating snoop request, which indicates that an invalidation may be performed (or is expected), but is not essential so that the invalidation can be overridden by the cache depending upon local knowledge of likely future access behaviour.

The read-with-overridable-invalidate transaction may not be the only type of read supported and the requesting master device may also issue other types of read. For example, a read-with-invalidate transaction may be provided which requests that the target data is provided to the requesting master, and if the data is in a cache, triggers a non-overridable invalidation which takes place regardless of whether or not the interconnect or the cache would have determined to override the invalidation if the transaction was a read-with-overridable-invalidate transaction. The read-with-invalidate transaction can be used by a requesting master in situations where allowing data to reside in other caches could lead to loss of coherency, so that a compulsory invalidation is required.

The coherency protocol may also support a read-no-invalidate transaction which can be issued by a requesting master device to request that the target data is provided to the master, without invalidation if the data is cached (in this case there is no discretion for the interconnect or the cache to trigger the invalidation). In response to the read-no-invalidate transaction when the target data is held in a given cache, the interconnect may issue a non-invalidating snoop request to the cache requesting a snoop operation for which the target data is retained in the cache regardless of whether or not the interconnect or the cache would have determined to override the invalidation in response to a read-with-overridable-invalidate transaction specifying the same target address. Hence, this transaction may be used for standard reads where no invalidation is required.

Hence, by providing an additional type of transaction to signal that an invalidation is optional but preferred (overridable), in addition to invalidating or non-invalidating read transactions, this provides the ability for the requesting master device to give a hint that an optional invalidate would likely improve performance, but is not essential.

FIG. 1 schematically illustrates an example of a data processing system 2 (e.g. an integrated circuit or system-on-chip) which includes a number of master devices 4, 6, 8 and an interconnect 10 for managing coherency between the master devices and other caches. In this example the master devices include a central processing unit (CPU) 4 for performing general purpose processing, a graphics processing unit (GPU) 6 for performing graphics processing and a network interface controller (NIC) 8 for controlling transmission and reception of data over a network. The CPU and a GPU include caches 11, 12, 14, e.g. level 1 caches associated with particular cores 9 and a shared level 2 cache 12 for the CPU or a shared cache 14 for the GPU (in practice, the cores 9 of the GPU could also have individual caches). The NIC 8 has processing circuitry 18 for controlling network packet transmission and reception, and a network interface 20 for transmitting the packets to the network and receiving packets from the network. Each of the master devices 4, 6, 8 has a coherency interface 16, 22 for interacting with the coherent interconnect. For example, the coherency interface 16, 22 may be responsible for generating the required coherency protocol transactions in response to cache accesses from the relevant master, and responding to snoop requests from the interconnect 10 with appropriate responses and changes of coherency state. It will be appreciated that this is just one example of some master devices and other types of masters could also be provided, such as display controllers for controlling display of data on a screen, or a DMA (direct memory access) controller for controlling transfer of data between memory and a peripheral device for example. Examples of coherency protocols which could be used are the AMBA® 4 ACE and AMBA® 5 CHI coherency protocols provided by ARM® Ltd of Cambridge, UK, but it will be appreciated that the techniques discussed herein could also be applied to other coherency protocols.

A system cache 30 is coupled to the coherent interconnect 10 but not assigned to a particular master device. The system cache 30 may, for example, be provided to speed up access to data by uncached masters such as the NIC 8, allowing faster access than if all reads and writes from the NIC 8 have to be served by main memory 33. The system cache 30 has a coherency interface 31 for responding to snoop requests or linefills of data from the coherent interconnect, and optionally may comprise control circuitry 32 for controlling whether to perform an invalidation of target data in response to a read-with-overridable-invalidate transaction as discussed above. The interconnect may also be coupled to other types of slave device 34, such as a cryptographic unit for providing cryptographic support to operations performed on the master devices.

As shown in FIG. 1, the coherent interconnect 10 may include a snoop filter 40 for tracking which data addresses are cached at certain master devices 4, 6. The snoop filter 40 can be used to reduce snoop traffic by allowing the coherent interconnect 10 to determine when data is not cached at a particular master. The snoop filter 40 is not essential, and in some embodiments may provide an interconnect 10 which does not attempt to track the data cached at each master. In this case, when one master 4, 6, 8 issues a read or write transaction to data which could be shared with other masters, the coherent interconnect 10 may trigger snoop transactions to be issued to each other master which could have a cached copy of the data from the same address, and manage changes in coherency state at those other masters and/or responses to the requesting master with more up to date versions of the data as necessary. However, if there are a lot of masters, then this approach of broadcasting snoops to all cached masters can be complex and result in a large volume of coherency traffic being exchanged within the system 2.

By providing a snoop filter 40 which can at least partially track which addresses are cached at the respective masters, this can help to reduce the volume of snoop traffic. In some cases the snoop filter 40 may precisely track the data stored in each master's cache, so that the coherent interconnect 10 can determine exactly which data is cached where. Hence, when a transaction is received from an initiating master directed to potentially shareable data then the interconnect 10 can determine from the content of the snoop filter 40 which other masters are caching data from the same address and send snoop transactions to those masters indicated in the snoop filter, avoiding the need to send snoops to other masters which are not currently storing the data.

However, other snoop filters may not track the content of the caches precisely. For example, a filter scheme may be used which ensures that the snoop filter 40 avoids false negatives, ensuring that any data which is present in the caches 11, 12, 14 is logged as present in the snoop filter, but which permits some false positives, so that sometimes the snoop filter 40 may indicate that data is cached in a given master, but actually the master has already invalidated the data. This approach of allowing some imprecision can reduce the overhead of updating the snoop filter as it means that not every invalidation from the master's cache 11, 12, 14 has to be reflected at the snoop filter.

Figure 2:
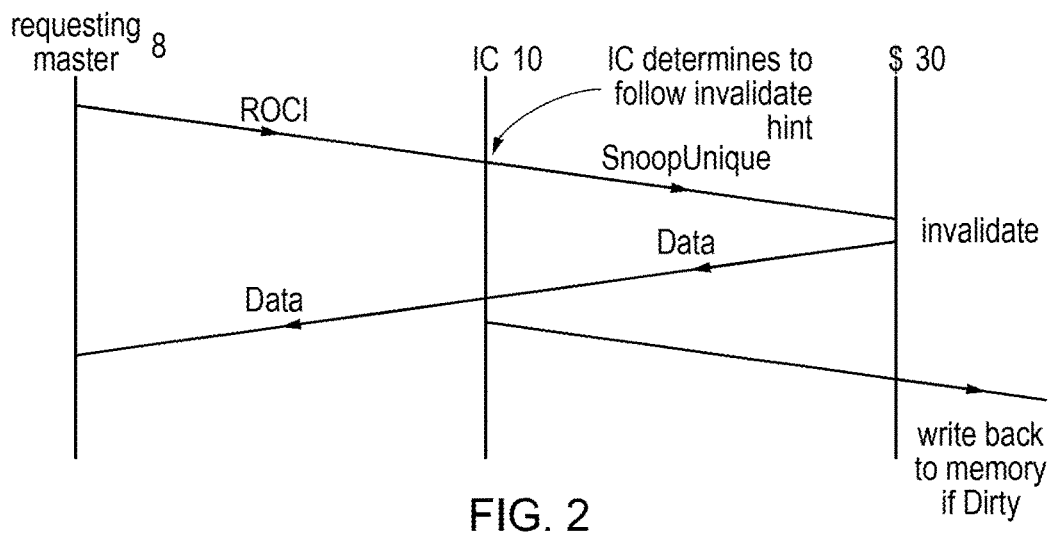
FIG. 2 illustrates processing of a first form of a read-with-overridable-invalidate transaction.

FIG. 2 shows an example of processing a read-once-clean-invalidate (ROCI) transaction, which is an example of the first form of a read-with-overridable-invalidate transaction. This transaction specifies a target address and returns target data associated with that address to the requesting master 8, as well as providing a hint that the target data should be written back to memory and deallocated from the cache holding that addressed data. However the deallocation is only a hint and the invalidation can be overridden by the interconnect 10 or the cache 12, 14, 30 holding the target data if desired.

FIG. 2 shows an example where the requesting master is the NIC 8 and the data specified by the ROCI transaction is held in the system cache 30. It will be appreciated that the same transaction could also be issued by other masters and the target data could be held in a different cache, such as a cache 12, 14 within a master device, but the subsequent examples use the NIC 8 and system cache 30 for ease of explanation. Note that if multiple caches hold the target data, the data may be returned from one of the caches (e.g. a cache holding the data in a Dirty state) and other caches holding the target data in a Clean state may not need to return the data. Dirty data is data which may have been modified relative to the corresponding data in memory—the Dirty coherency state indicates that the cache holding the data has responsibility for writing the data back to memory on invalidation.

The requesting master 8 issues the ROCI transaction to the interconnect 10. In this example, the interconnect 10 has the function of determining whether or not to follow or override the invalidate hint. In the example of FIG. 2, the interconnect determines to follow the invalidate hint. Hence, having looked up the snoop filter 40 to determine that the system cache 30 holds the address data, the interconnect 10 responds to the ROCI transaction by sending a SnoopUnique request, which is an invalidating snoop request which requests that the system cache 30 invalidates the data from the cache 30. In this example, as the data is cached in the Dirty state it is returned to the interconnect by the cache 10, and the interconnect 10 triggers a write back operation to write the data back to the main memory 33. However, if the data was clean the write back would not be required, and the data might not be returned at all if another cache holds more up to date data in the Dirty state. Regardless of whether the data is obtained from the cache itself or from another cache or memory, the interconnect 10 returns the read data to the requesting master 8. The ROCI transaction is an uncached transaction and so the data is not cached by the requesting master 8 upon receipt (in any case, for the example of the NIC 8 the requesting master has no cache so cannot cache the data—uncached masters like the NIC 8 are restricted to issuing uncached read requests).

Figure 3:
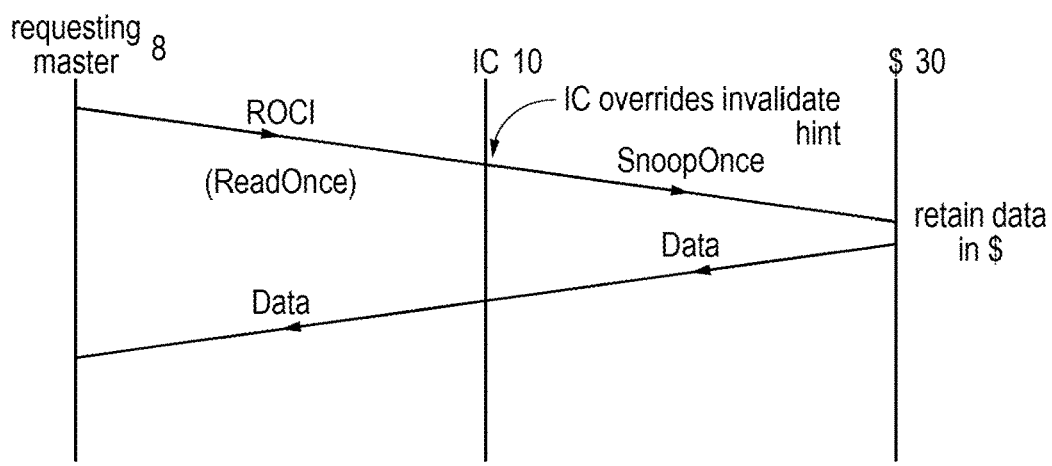
FIG. 3 shows an example of an interconnect overriding the invalidation in response to the read-with-overridable-invalidate transaction.

FIG. 3 shows processing of the same type of ROCI transaction, but in this case the interconnect 10 determines that the invalidation should be overridden and the target data retained in the cache 30. For example, the interconnect 10 may base this decision on recent address patterns. For example, if the interconnect 10 has observed that there have been a number of recent accesses to a similar range of addresses to the address of the requested data then the interconnect 10 may decide it is possible that the data may be needed again and so the invalidation should not be performed. Hence, instead of sending a SnoopUnique request as in FIG. 2, the interconnect 10 responds to the ROCI transaction with a SnoopOnce request, which is a non-invalidating snoop request which requests that dirty data associated with the target address is read from the cache 30 and returned while retaining the data in the cache. As there is no invalidation, in this case there is no need for a writeback as in FIG. 2 and again the data is returned to the requesting master 8.

As shown in FIG. 3, the requesting master 8 can also issue a ReadOnce transaction (read-no-invalidate transaction) which specifies a target address for which data is to be read and returned to a requesting master 8 without triggering an invalidation. The ReadOnce transaction is handled in the same way as the ROCI transaction in the case when the interconnect overrides the invalidation. Hence the ReadOnce transaction triggers the interconnect to issue a SnoopOnce request. By choosing whether a given uncached read operation is issued as an ROCI transaction or a ReadOnce transaction, the requesting master 8 can pass a hint indicating whether it is likely that the target data will be required again.

Figure 4:
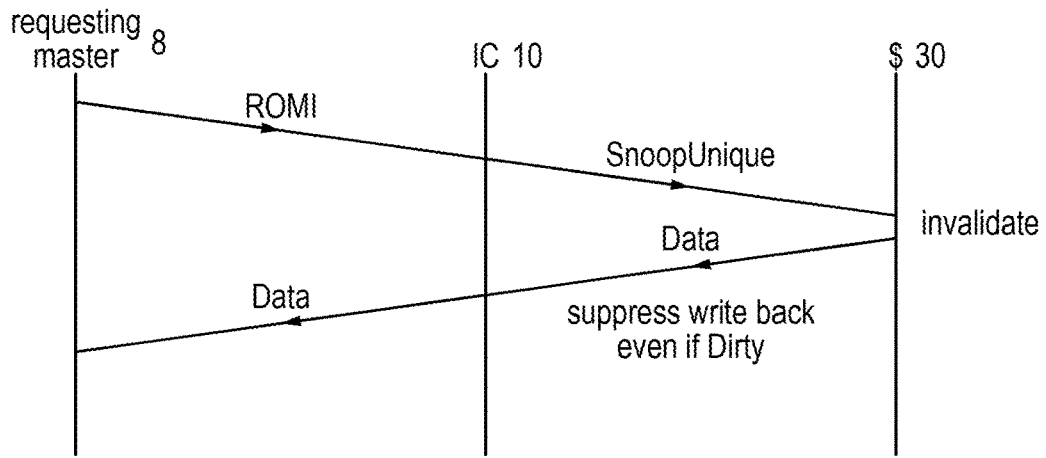
FIG. 4 shows processing of a second form of the read-with-overridable-invalidate invalidate transaction for which writeback of dirty data following the invalidation is suppressed.

FIG. 4 shows an example of a read-once-make-invalid (ROMI) transaction which is an example of a second form of the read-with-overridable-invalidate transaction. If the invalidation is not overridden by the interconnect 10, the ROMI transaction triggers the interconnect 10 to issue a SnoopUnique request in the same way as in FIG. 2. If the invalidation is overridden by the interconnect 10, the ROMI triggers a SnoopOnce request which is handled in the same way as in FIG. 3. In the case when a SnoopUnique request is sent to the cache 30, this triggers invalidation of the target data from the cache 30 in the same way as in FIG. 2 and the data is returned. However, unlike the ROCI transaction in FIG. 2, for a ROMI transaction the writeback of the data to the main memory 33 or to a further cache is suppressed even if the data returned is in the dirty state. This saves an additional write operation to the main memory 33 which can help improve performance because there is more bandwidth available for handling other accesses to memory. The ROMI transaction can be issued in situations where the requesting master 8 knows that it is guaranteed that the data will never be needed again and so by avoiding an unnecessary write, performance can be improved.

Alternatively, some implementations may implement ROMI such that the interconnect 10 has the discretion to determine whether or not the writeback is performed. In this case, rather than an explicit direction not to perform the writeback, the ROMI may be interpreted a hint to the interconnect 10 that the data will not be needed again and so the writeback can be omitted, but the interconnect 10 could determine to perform the writeback anyway if desired—e.g. because it has seen an access to the same address or a nearby address, or because current memory bandwidth utilisation is low and so there is spare bandwidth for performing the writeback to guard against the very rare cases when the requesting master device 8 incorrectly chooses to use the ROMI instruction instead of ROCI. In examples where the ROMI instruction indicates that the writeback is optional but can still be performed, ROMI can effectively be treated as ROCI by the interconnect 10, but ROCI cannot be treated as ROMI—if ROCI is issued the interconnect 10 should perform the writeback when the target data invalidated from the cache 30 is dirty, even if it would have chosen not to perform the writeback if the transaction had been ROMI.

FIGS. 2 to 4 show examples where the interconnect 10 is given the discretion to choose whether or not to follow or override the invalidate hint provided by the ROCI or ROMI transaction. However, some interconnects may choose to always ignore the hint or follow the hint. For example, some implementations of the interconnect 10 could determine that that invalidate hint should always be overridden, and so the ROCI or ROMI transactions could be downgraded to ReadOnce transactions. In this case, the ROCI/ROMI transactions could trigger a SnoopOnce request as in FIG. 3 so that the data is retained in the cache 30.

Figure 5:
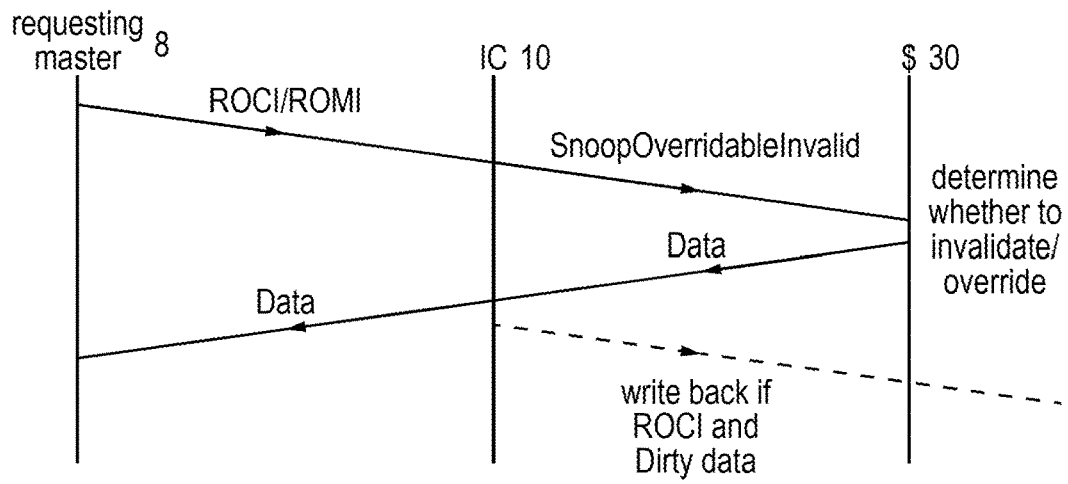
FIG. 5 shows an example of a cache determining whether or not to override the invalidation in response to the read-with-overridable-invalidate transaction.

In the examples of FIGS. 2 to 4, no modification of the cache 30 itself is required if it can already handle invalidating and non-invalidating forms of snoop requests (SnoopUnique and SnoopOnce) as discussed above. However, in the example of FIG. 5, a new type of snoop request (snoop-with-overridable-invalidate request) is defined which is sent by the interconnect 10 to the cache 30 in response to an ROCI or ROMI transaction from the requesting master 8. As shown in FIG. 5, the snoop-with-overridable-invalidate request indicates to the cache 30 that the data should be read and returned to the interconnect 10 if Dirty, but that whether or not the data is invalidated can be determined by the cache itself. This differs from standard snoops which would either specify that the data should be invalidated or that it should not be invalidated, but would give no discretion to the cache itself. The expectation can be that the cache 30 would in most cases invalidate in order to free up cache capacity, but could sometimes override depending upon recent address access history. The control circuitry 32 in the system cache 30, or the coherency interface 16 for caches associated with cached master devices 4, 6 could be responsible for determining whether to perform or override the invalidation. The control circuitry associated with the cache 30, 12, 14 may have better local knowledge of recent access patterns than the requesting master 8 and so by providing the ability for the cache 30, 12, 14 to ignore the invalidation, this can sometimes improve efficiency by reducing the chance that a data value which actually is still needed is invalidated so that it has to be fetched from memory, or even discarded altogether in the case of ROMI. If the control circuitry 32, 16 for the cache determines to invalidate, the interconnect can choose whether to writeback depending on whether the transaction was ROCI or ROMI (or for ROMI depending on other factors such as memory system bandwidth or address access history), while if the cache chooses to override the invalidation then no writeback is needed.

Figure 6:
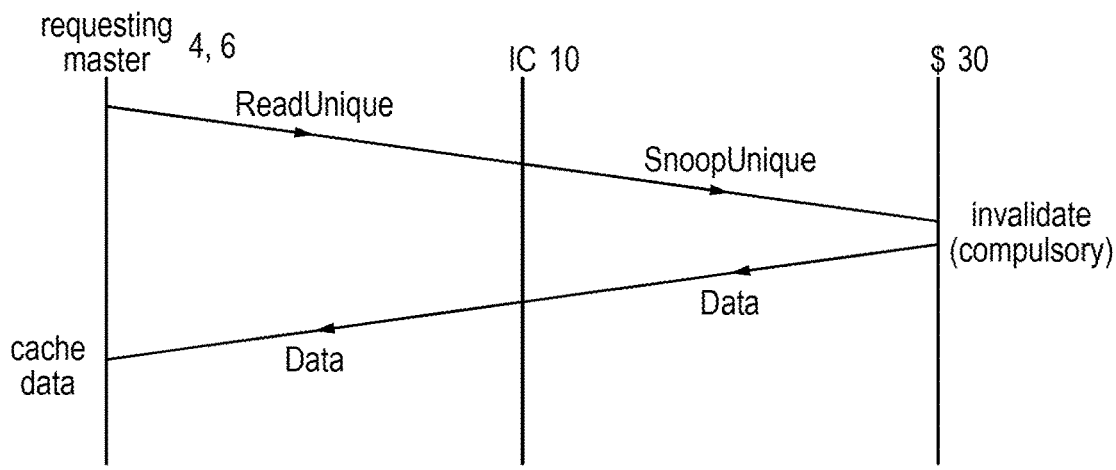
FIG. 6 shows an example of processing of a read-with-invalidate transaction for which the invalidation cannot be overruled by the interconnect or the cache.

FIG. 6 shows an example of a ReadUnique (read-with-invalidate) transaction which can be issued by a requesting master 4, 6 to trigger a compulsory invalidation of data from another cache 30. For example, the ReadUnique transaction may be useful if the requesting master 4, 6 will make a partial update of a cache line, so that it needs the most up to date version of other parts of the cache line as they will not be overwritten by a subsequent write. By triggering an invalidation in other caches 30, this avoids stale data being retained in that other cache following the requesting master's write. Unlike the ROCI or ROMI transactions, with the read unique transaction, the invalidation is required and cannot be overridden by either the interconnect 10 or the cache 30. Hence, the ReadUnique transaction triggers a SnoopUnique request to the cache 30. Unlike ROCI/ROMI, the ReadUnique transaction is a cached read transaction, so when the data is returned to the requesting master, the requesting master 4, 6 stores the data in its cache. Hence, there is no need to trigger a writeback in response to ReadUnique even if the data is dirty, as the most up to date data is still retained in the cache of the requesting master 4, 6.

Figure 7:
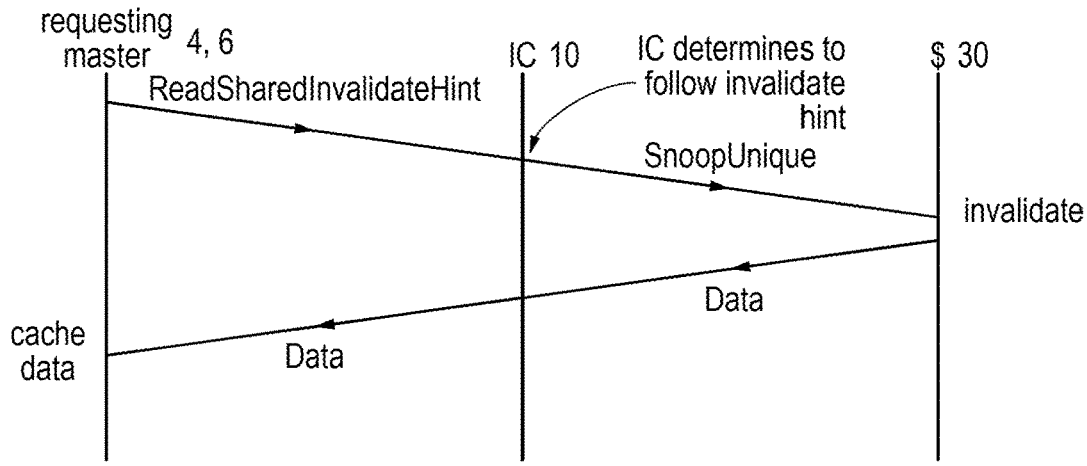
FIG. 7 illustrates an example of a cacheable read-with-overridable-invalidate transaction for which the target data is cached at the requesting master device.

FIG. 7 shows an example of using the overridable invalidate hint on a cached read transaction. In this case a requesting master 4, 6 sends a ReadSharedInvalidateHint transaction which is an example of a cacheable form of the read-with-overridable-invalidate transaction. This transaction is handled in the same way as shown in FIG. 2 except that when the data is returned to the requesting master 4, 6 it is stored in the master's cache 12, 14 and no writeback is required. While FIG. 7 shows an example where the interconnect 10 determines whether or not to follow or override the invalidate hint, it will be appreciated that this form of the transaction could also be handled with the cache 30 determining whether to overwrite the validation as in FIG. 5. Hence, the ReadSharedInvalidateHint transaction gives the requesting master 4, 6 the capability of issuing a transaction which instructs the interconnect to invalidate the cache line, but the master is willing to accept the interconnect or target cache 30 to override this request and not invalidate the line. The interconnect could also support a ReadShared request from the master which does not give any instruction to the interconnect to invalidate a line but which would permit the interconnect to invalidate if it prefers. The ReadSharedInvalidateHint transaction hence provides an overridable invalidate request, in contrast to the ReadShared transaction which provides an overridable non-invalidate request (differing in terms of what the default response to the transaction should be in the absence of any exceptional condition determined by the interconnect or target cache). Hence, the master 4, 6 can use the ReadSharedInvalidateHint transaction when it expects that it will not be useful to continue caching the data, and the ReadShared transaction otherwise.

The type of coherency transaction (e.g. ROCI, ROMI, ReadOnce or ReadUnique) triggered by the coherency interface 16 in response to a given load/store operation performed by the processing circuitry 10, 18 in a given master device 4, 6, 8 could be controlled based on software hints provided by the software being executed which indicate which type of transaction is required. However, often the coherency protocol implemented using the interconnect 10 may be entirely transparent to software, so that the software simply issues a load/store operation, but whether that operation triggers a ROCI, ROMI, ReadOnce or ReadUnique transaction can be determined by the coherency interface 16, 22, for example based on factors such as previous address usage patterns observed by the interface, or on parameters defined in a memory management unit for the required address (e.g. some addresses may be marked as non-shared so that it is not necessary to maintain coherency and so there is no need to use ROCI or ROMI as the data would not be cached elsewhere). Hence, while providing ISA support for the ROCI or ROMI instructions could help a programmer influence the choice of coherency transaction, in many cases the ROCI/ROMI transactions etc. may be generated automatically by the coherency interface 16, 22 or by a non-CPU requester such as the NIC 8 from knowledge of traffic patterns and data usable information, transparent to software.

The various types of Read transaction discussed above may be distinguished by a transaction identifier specifying the type of transaction. Alternatively, some transactions could share a same transaction identifier, but have a separate parameter which further defines the function of the transaction (e.g. a bit specifying whether the read is a cached or uncached read, or a bit specifying whether the invalidation is compulsory or overridable). It will be appreciated that a given system implementation may not implement all of the types of transactions discussed above, but could select only a subset of these transactions.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A system comprising:
a plurality of master devices; and
an interconnect to manage coherency between the plurality of master devices;
wherein in response to a read-with-overridable-invalidate transaction received by the interconnect from a requesting master device requesting that target data associated with a target address is provided to the requesting master device, when target data associated with the target address is stored by a hardware cache, the interconnect is configured to issue a snoop request to said hardware cache, said snoop request triggering invalidation of the target data from the hardware cache except when at least one of said interconnect and said hardware cache determines to override the invalidation and retain the target data in the hardware cache.

2. The system according to claim 1, wherein in response to a first form of the read-with-overridable-invalidate transaction, when the target data is invalidated from the hardware cache and the target data is dirty, the interconnect is configured to trigger a writeback of the target data to a memory or a further hardware cache.

3. The system according to claim 1, wherein in response to a second form of the read-with-overridable-invalidate transaction, when the target data is invalidated from the hardware cache and the target data is dirty, the interconnect is configured to suppress a writeback of the target data to a memory or a further hardware cache.

4. The system according to claim 1, wherein in response to a third form of the read-with-overridable-invalidate transaction, when the target data is invalidated from the hardware cache and the target data is dirty, the interconnect is configured to determine whether to trigger or suppress a writeback of the target data to a memory or a further hardware cache.

5. The system according to claim 1, wherein the read-with-overridable-invalidate transaction comprises an uncached read transaction requesting that the target data is provided to the requesting master device with caching of the target data at the requesting master device being suppressed.

6. The system according to claim 1, wherein said at least one of said interconnect and said hardware cache is configured to determine whether to override the invalidation in dependence on monitoring of addresses accessed in the hardware cache.

7. The system according to claim 1, wherein the interconnect is configured to determine whether to override the invalidation in response to the read-with-overridable-invalidate transaction.

8. The system according to claim 7, wherein the interconnect is configured to select whether the snoop request issued to the hardware cache in response to the read-with-overridable-invalidate transaction is an invalidating snoop request requesting invalidation of the target data from the hardware cache or a non-invalidating snoop request requesting a snoop operation for which the target data is retained in the hardware cache.

9. The system according to claim 1, wherein in response to the read-with-overridable-invalidate transaction, the interconnect is configured to issue a snoop-with-overridable-invalidate request as said snoop request to the hardware cache; and
in response to the snoop-with-overridable-invalidate request, the hardware cache is configured to determine whether to override the invalidation.

10. The system according to claim 1, wherein in response to a read-with-invalidate transaction received by the interconnect from a requesting master device requesting that target data associated with a target address is provided to the requesting master device, when target data associated with the target address is stored by the hardware cache, the interconnect is configured to issue an invalidating snoop request to said cache triggering invalidation of the target data from the hardware cache regardless of whether the interconnect or the cache would have determined to override the invalidation in response to a read-with-overridable-invalidate transaction specifying the same target address as the read-with-invalidate transaction.

11. The system according to claim 1, wherein in response to a read-no-invalidate transaction received by the interconnect from a requesting master device requesting that target data associated with a target address is provided to the requesting master device, when target data associated with the target address is stored by the hardware cache, the interconnect is configured to issue a non-invalidating snoop request to said hardware cache requesting a snoop operation for which the target data is retained in the hardware cache regardless of whether the interconnect or the hardware cache would have determined to override the invalidation in response to a read-with-overridable-invalidate transaction specifying the same target address as the read-no-invalidate transaction.

12. A master device comprising:
processing circuitry to execute data access operations; and
interface circuitry responsive to the data access operations to issue transactions to an interconnect for managing coherency between the master device and at least one other master device;
wherein the interface circuitry is configured to issue a read-with-overridable-invalidate transaction to the interconnect requesting that target data associated with a target address is provided to the master device, and, when the target data is stored in a hardware cache, triggering invalidation of the target data from the hardware cache except when at least one of said interconnect and said cache determines to override the invalidation and retain the target data in the hardware cache.

13. An interconnect comprising:
interface circuitry to communicate with a plurality of master devices; and
control circuitry to manage coherency between the master devices in dependence on transactions exchanged with the master devices via the interface circuitry;
wherein in response to a read-with-overridable-invalidate transaction received by the interface circuitry from a requesting master device requesting that target data associated with a target address is provided to the requesting master device, when target data associated with the target address is stored by a hardware cache, the control circuitry is configured to control the interface circuitry to issue a snoop request, said snoop request triggering invalidation of the target data from the hardware cache except when at least one of said control circuitry and said hardware cache determines to override the invalidation and retain the target data in the hardware cache.

14. An apparatus comprising:
a hardware cache to store data;
interface circuitry to receive, from an interconnect for managing coherency of data in the hardware cache, a snoop-with-overridable-invalidate request specifying a target address of target data and requesting that the target data is invalidated from the hardware cache; and
control circuitry to determine whether to override the invalidation of the target data and retain the target data in the hardware cache in response to the snoop-with-overridable-invalidate request.

15. A method comprising:
receiving, at an interconnect for managing coherency between a plurality of master devices, a read-with-overridable-invalidate transaction issued by a requesting master device requesting that target data associated with a target address is provided to the requesting master device; and in response to the read-with-overridable-invalidate transaction:
  obtaining the target data from a hardware cache or memory;
  providing the target data to the requesting master device; and
  when the target data is stored by the hardware cache, triggering invalidation of the target data from the hardware cache except when at least one of said interconnect and said cache determines to override the invalidation and retain the target data in the hardware cache.

16. The method of claim 15, wherein in response to the read-with-overridable-invalidate transaction, the interconnect determines whether to override the invalidation.

17. The method of claim 16, wherein the interconnect selects whether a snoop request issued to the hardware cache in response to the read-with-overridable-invalidate transaction is an invalidating snoop request requesting invalidation of the target data from the hardware cache or a non-invalidating snoop request requesting a snoop operation for which the target data is retained in the hardware cache.

18. The method of claim 16, wherein the interconnect determines whether to override the invalidation in dependence on monitored address access patterns.

* * * * *